United States Patent [19]

Pollard et al.

[11] Patent Number: 4,669,945
[45] Date of Patent: Jun. 2, 1987

[54] FOLDABLE AND SWIVELABLE HOPPER-LOADING SCREW CONVEYOR

[75] Inventors: Lorne R. Pollard, Naperville, Ill.; Donald K. Tashiro, Hamilton, Canada

[73] Assignee: J. I. Case Company, Racine, Wis.

[21] Appl. No.: 844,369

[22] Filed: Mar. 26, 1986

[51] Int. Cl.⁴ .............................................. B65G 67/02
[52] U.S. Cl. .................................... 414/505; 198/313; 198/668; 414/526
[58] Field of Search ................ 414/503, 504, 505, 526; 198/311, 313, 632, 668

[56] References Cited

U.S. PATENT DOCUMENTS

| | | |
|---|---|---|
| 688,912 | 12/1901 | Watts .................................. 198/311 |
| 2,057,403 | 10/1936 | Vali et al. ............................. 414/504 |
| 3,337,068 | 8/1967 | Meharry . |
| 3,584,732 | 6/1971 | Tyler . |
| 3,664,444 | 5/1972 | Henson . |
| 3,717,272 | 2/1973 | Chartier . |
| 3,719,268 | 3/1973 | Koehnen . |
| 4,142,621 | 3/1979 | Oliver . |
| 4,217,980 | 8/1980 | Kemp, Jr. . |
| 4,220,242 | 9/1980 | Forsberg . |
| 4,289,440 | 9/1981 | Walberg . |
| 4,300,333 | 11/1981 | Anderson . |
| 4,312,621 | 1/1982 | Quanbeck . |
| 4,336,877 | 6/1982 | Gill . |
| 4,338,872 | 7/1982 | Decker . |
| 4,368,003 | 1/1983 | MacDonald . |
| 4,427,105 | 1/1984 | Hawley . |
| 4,530,429 | 7/1985 | Erickson . |

Primary Examiner—Joseph E. Valenza
Assistant Examiner—Stuart J. Millman
Attorney, Agent, or Firm—Dressler, Goldsmith, Shore, Sutker & Milnamow, Ltd.

[57] ABSTRACT

A foldable and swivelable screw conveyor mounted on a transportable storage hopper is disclosed. The storage hopper typically contains particulate material such as grain, fertilizer and the like. The present invention is directed to a spatially-compact hopper-loading screw conveyor which can be folded onto a frame portion of the storage hopper, and which can be secured thereto. The conveyor is foldable along a hinge joint and swivelable along a swivel joint. The screw conveyor has an inlet chute which can be placed on the ground. The foldability and swivelability features allow the screw conveyor to be carried in a spatially-compact fashion on the storage-hopper frame when not in use and further allow the inlet chute to be placed on the ground and extended away from the storage hopper, to convey particulate material into the storage hopper, as desired.

7 Claims, 4 Drawing Figures

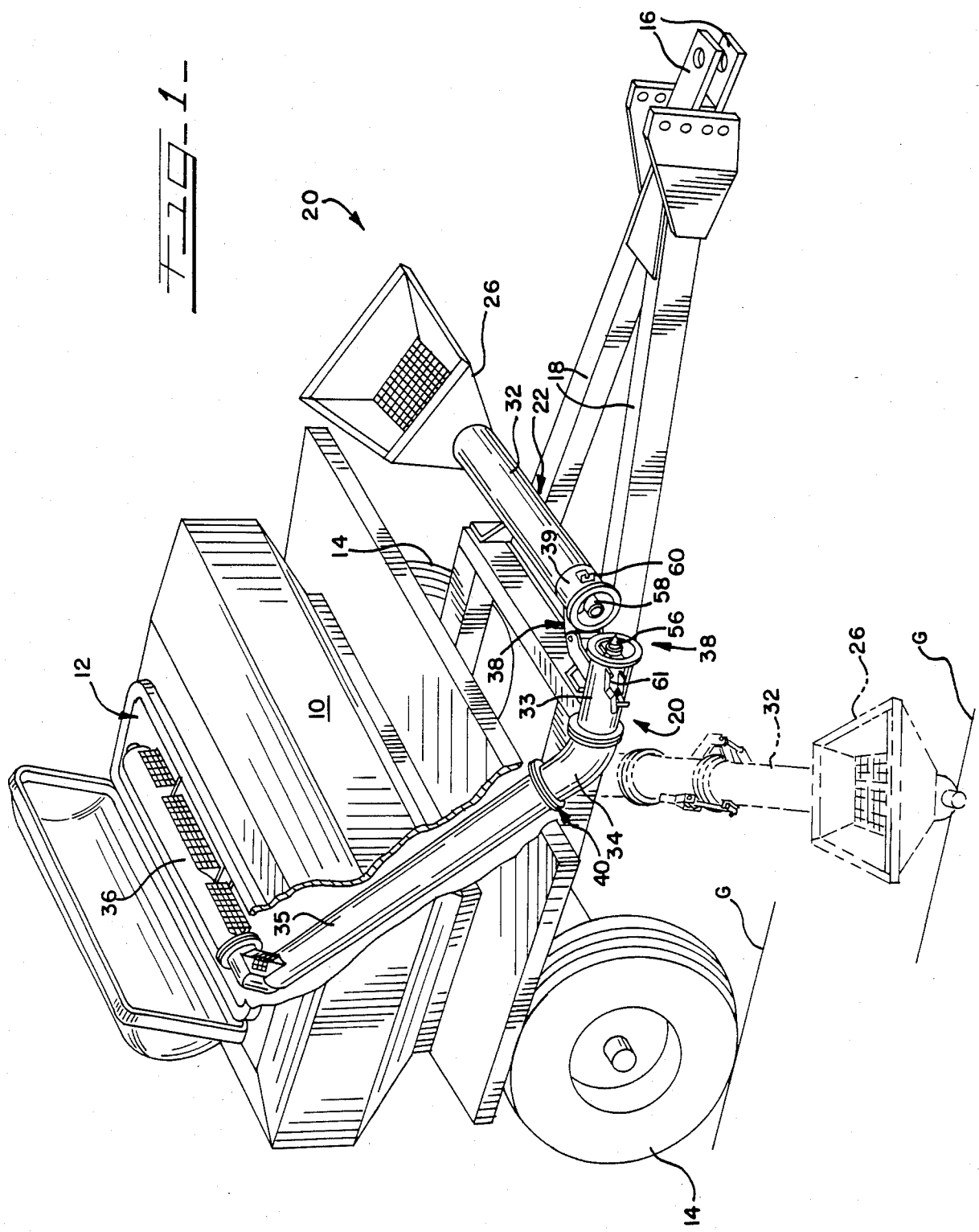

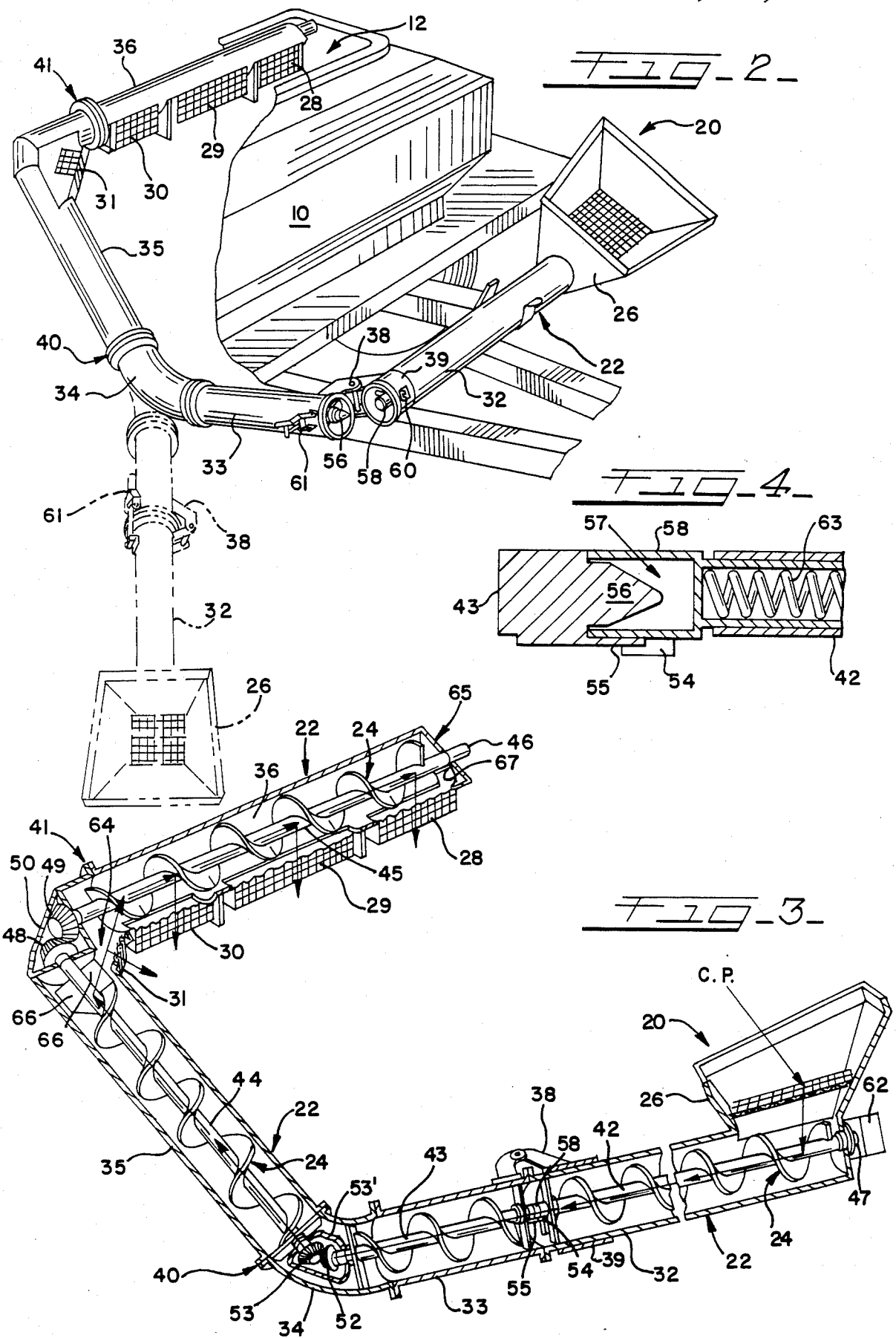

FOLDABLE AND SWIVELABLE HOPPER-LOADING SCREW CONVEYOR

TECHNICAL FIELD OF THE INVENTION

The present invention is generally directed to a relatively compact screw conveyor used for loading seeds, particles of fertilizer and like particulate material into a transportable storage hopper. More particularly, the hopper-loading screw conveyor, mounted on the transportable storage hopper, is foldable along a hinge joint and is swivelable along a swivel joint.

The "fold" and the "swivel" features allow the screw conveyor to be mounted in a compact manner on the storage-hopper frame when the conveyor is not in use. These features also allow the screw conveyor to be extended away from the storage hopper, to convey particulate material therein, when desired.

BACKGROUND OF THE INVENTION

Farmers typically make use of pneumatic-distribution systems to plant seed and/or to fertilize the soil. See, for example, U.S. Pat. No. 3,631,825 to Weiste. Such a seed- and/or fertilizer-distributipn system, generally pulled through the field by a tractor, is typically supplied particulate material from a transportable storage hopper. The tractor typically pulls such a storage hopper through the field. The distribution system typically co-acts with soil-engaging ground tools to disperse the particulate material into the soil in a pprede-termined manner. See, for example, U.S. Pat. No. 3,499,495 to Pust; U.S. Pat. No. 3,552,601 to Hansen; U.S. Pat. No. 3,982,670 to Brass; U.S. Pat. No. 4,009,668 to Brass et al.; and U.S. Reissue Pat. No. 27,578 to Keeton.

Typically, transportable storage hoppers are filled by having the material either dumped, or conveyed pneumatically or otherwise, into the hopper through the opening thereof. Such methods of filling the storage hopper can be cumbersome and time-consuming, however, and often give rise to waste, as spillage of the particulate material onto the ground is a typical result. Also, the transportable storage hopper opening is typically spaced higher above the ground than the dump chute of a truck, used to fill the storage hopper. This, too, adds to the above-mentioned waste problem. Further, conventional means for filling transportable storage hopper with seed and/or fertilizer are rarely compact, but rather, are typically cumbersome.

SUMMARY OF THE INVENTION

The present invention is a foldable and swivelable screw conveyor mounted on a transportable storage hopper. The screw conveyor comprises a segmented housing, and segmented conveyor elements disposed in the conveyor housing. The conveyor includes a feed chute at the inlet end, and preferably four discharge apertures at the outlet end. Two segments of the conveyor housing are hingedly connected, to allow the feed-chute portion of the screw conveyor to be folded into the "transport position" onto frame members of the transportable storage hopper. When folded onto and secured to the storage hopper frame members, the conveyor is readily transported, in a tucked-in and compact fashion, along with the storage hopper through the field. The two hingedly-connected conveyor-housing segments, further, are pivotable about a swivel joint, relative to a third conveyor-housing segment. The "swivel" feature allows the conveyor to be unfolded so as to position the feed chute on the ground in the "working position" when the screw conveyor is to be used to fill the storage hopper. Preferably, the intake hopper, when positioned atop the ground, is of sufficient cross-sectional area to receive particulate material from most truck-dump chutes so as to minimize waste. The screw conveyor is preferably driven by hydraulic fluid drive means or a power take off system, either of which preferably derives its power from the tractor.

BRIEF DESCRIPTION OF THE DRAWINGS

FIG. 1 is a perspective view of the screw conveyor of the present invention, mounted on a conventional wheeled particulate-material storage hopper;

FIG. 2 is a fragmented perspective view;

FIG. 3 is a sectional view, on an enlarged scale relative to FIGS. 1 and 2; and

FIG. 4 is a sectional view, on an enlarged scale relative to FIGS. 1-3, showing two adjacent screw-conveyor end portions in biased engagement when the hinge joint is closed.

DETAILED DESCRIPTION OF THE PREFERRED EMBODIMENT

While the present invention is susceptible to embodiment in various forms, there is shown in the drawings and hereinafter described in detail a presently preferred embodiment of the invention, with the understanding that the present disclosure is to be considered as an exemplification of the invention without limitation to the specific embodiment illustrated.

Referring initially to FIG. 1, there is shown a transportable storage hopper 10 having a hopper opening 12. The storage hopper 10 is mounted on spaced wheels 14. The transportable storage hopper 10 includes hitch members 16, connected to the hopper 10 through frame members 18. The hitch members 16 are for hitching the transportable storage hopper 10 to a tractor (not shown). The frame members 18 are joined together, adjacent the hitch members 16, in a V-shape.

The screw conveyor 20 of the present invention, shown mounted on the illustrated transportable storage hopper 10, will now be discussed. Referring initially to FIG. 3, the screw conveyor 20 is seen to comprise a conveyor housing 22 and a helical-type (i.e. screw-flighted) conveying element 24 disposed within the housing 22. The conveyor 20 includes an intake hopper or feed chute 26 which is integral with the housing 22. The feed chute 26 is located on the supply or feed end of the conveyor 20, in spaced relation to the hopper 10.

Opposite the intake-hopper end of the housing 22 are discharge openings or outlet holes 28–31 for discharging particulate material from the conveyor housing 22 into the storage hopper 10, by way of the hopper opening 12. Such particulate material includes seed, particles of fertilizer, and the like. The feed chute 26 is screened (FIGS. 1–3) to minimize the likelihood of foreign matter being introduced into the conveyor housing 22 by way of the feed chute 26; and the apertures 28–31 are also screened to further minimize the likelihood of any foreign matter which by chance passed into the conveyor housing 22 from passing into the storage hopper 10 at the opening 12. The screen openings of the feed chute 26 and each one of the outlet holes 28–31 must, of course, be large enough in cross-sectional area as to allow the particulate material, which is to be conveyed into hopper 10, to freely pass therethrough.

A feature of the present invention, which allows the screw conveyor 20 to be folded into a spatially-compact configuration on the storage hopper 10 will now be discussed. Preferably, the housing 22 includes five flanged conveyor-housing segments 32-36 (FIG. 2), adjacent pairs of which are removably coupled together at the flanged connections thereof. The first and second conveyor-housing segments 32 and 33 have a hinge joint 38 mounted thereon for hingedly connecting the first and second segments 32 and 33 together. The hinge joint 38 further allows the first conveyor-housing segment 32 to be pivoted about the hinge joint 38 for folding the first conveyor-housing segment 32 transverse to the second conveyor-housing segment 33 (FIGS. 1 and 2). The first conveyor-housing segment 32 can thus be positioned on the frame members 18, and secured thereto (by conventional securement means), when it is desirable to fold the conveyor housing 22 for transport (FIG. 1). In the illustrated tucked-away or so-called "transport" position, the first conveyor-housing segment 32 is securely held in place on the frame members 18 by conventional securement means (not shown).

In the preferred form, the hinge 38 is connected to segment 32 by means of a sleeve 39 rotatably fitted to segment 32. This arrangement desirably allows rotation of the segment 32 relative to the hinge, thus allowing the chute 26 to be positioned horizontally for filling, and in any other selected orientation for storage and transport. The chute 26 can also be inverted for emptying the contents therein if filling is completed and the storage hopper 10 is full.

Another feature of the present invention, which allows selected conveyor-housing segments to be swiveled, one segment relative to its adjacent segment, so as to position the feed chute 26 away from (i.e. spaced in distal relation to) the storage hopper 10, will now be discussed. A first swivel joint 40 (FIGS. 1-3), connecting the third and fourth conveyor-housing segments 34 and 35, allows the first three conveyor-housing segments 32-34 to be swiveled about the swivel joint 40 relative to the fourth conveyor-housing segment 35, for positioning the feed chute 26 away from the storage hopper 10. This swivelability feature thus allows the screw conveyor 20 to be fed particulate material substantially without interference from structure on the storage hopper 10. That is, the feed chute 26 can readily be placed on the ground G at a location which is suitably spaced from the storage hopper 10.

A second, optional swivel joint 41 (FIGS. 2 and 3) can be mounted on the screw conveyor housing 22, for example between the fourth and fifth conveyor-housing segments 35 and 36, if desired. Of course, the structure of the storage hopper 10 may have to be modified somewhat from what is shown in FIG. 1 to permit swiveling of the fourth conveyor-housing segment 35 relative to the fifth conveyor-housing segment 36, at the second swivel joint 41. Such modification, however, is well known to those skilled in the art.

Preferably, the feed chute 26 is positioned directly on the ground G (FIG. 1) to receive particulate material from the dump chute of a truck (not shown). Such a truck-dump chute is thus typically used to fill the storage hopper 10. The hinge joint 38 and first swivel joint 40 co-act to allow the feed chute 26 to be positioned directly on the ground G. That is, from the transport position (FIG. 1), the first conveyor-housing segment 32 is lifted from frame members 18 and pivoted about hinge joint 38 until the flanges of adjacent first and second conveyor-housing segments 32 and 33 abut. Conventional latch means 60 and 61 are used to secure the adjoining flanged ends of the first and second conveyor-housing segments 32 and 33 together in abutting engagement. The three conveyor-housing segments 32-34 are then swiveled clockwise at swivel joint 40 relative to the fourth conveyor-housing segment 35 for positioning the feed chute 26 on the ground G, in spaced relation to the storage hopper 10. Segment 32 can be rotated prior to clamping of clamp members 60,61 to orient the hopper horizontally for receiving seed or other particulate matter. The clamping of the segments together frictionally holds the segment 32 against rotation relative to the sleeve 39.

Referring back to FIG. 3, the internal elements of the screw conveyor 20 will now be discussed. The conveying element 24 preferably comprises four conveying-element segments 42-45, each of which is bearing-mounted within the conveyor housing 22. The four conveying-element segments 42-45, together with the feed chute 26 and discharge openings or outlet holes 28-31, define a conveying path C.P. (FIG. 3) through the conveyor housing 22.

Conveying-element ends 46 and 47 extend through the conveyor housing 22 to allow the conveying element 24 to be driven at either the first (or upper) conveying-element end 46 or at the second (or lower) end 47 by conventional driving means, as desired. Such a drive means can be an electric motor, or a mechanical motor such as a hydraulic motor; or the drive means can be powered by a power-take-off or other system on the tractor (not shown). The preferred drive means is a hydraulic fluid motor, or is driven by a power-take-off system or other system on the tractor. Such a drive means is preferably controlled by a hand-operated valve. A conventional valve of this type can provide the conveying element 24 with "forward", "neutral" and/or "reverse" rotational-direction control.

Preferably, the lower end 47 has a conventional drive means 62 mounted thereon for driving the conveying element 24 in a well-known "push" manner. That is, the preferred drive means 62 causes the particulate material to be pushed through the conveyor housing 22. The particulate material thus is fed into the conveyor housing 22 via the feed chute 26 and is discharged from the conveyor housing 22 into the storage hopper 10 via the outlet holes 28-31. When the drive means is mounted on the lower conveying-element end 47, the end 65 (FIG. 3) of the conveyor housing 22 adjacent the upper conveying-element end 46 preferably includes openings (not shown) to prevent pluggage thereat.

Similarly, the first or upper end 46 of the conveying element 24 can also include well-known drive means. When located at the upper end 46, however, the drive means "pulls" the particulate material through the conveyor housing 22, in a well-known manner, using the conveying element 24 to do so. For example, first end 46 can be driven by a conventional multi-rotational drive means, to cause particulate material entering the conveyor housing 22 via the feed chute 26 to be pulled through the conveyor housing 22 by rotation of the conveying-element segments 42-45.

Preferably, the illustrated drive means 62 (FIG. 3) causes the first and second conveying-element segments 42 and 43 together to axially rotate and thereby push particulate material through the first and second conveyor-housing segments 32 and 33. The manner by which axial rotation of the first conveying-element segment 42 causes axial rotation of the second conveying-element segment 43 will be discussed in greater detail further below. Briefly, however, the drive means 62 causes the conveying-element segments 42-45 to axially rotate in the same directional sense, as follows.

Between the second and fourth conveyor-housing segments 33 and 35, first and second bevel gears 52 and 53 are meshingly disposed together within the elbow or third conveyor-housing segment 34. The bevel gears 52 and 53 are respectively mounted on adjacent end portions of the second and third conveying-element segments 43 and 44 so that axial rotation of the second conveying-element segment 43 causes axial rotation of the third conveying-element segment 44 in the same rotational sense. Gear case 53' is preferably provided to enclose and protect gears 52 and 53 against damage or jamming as material is moved through the conveyor.

Respective lower and upper bevel gears 48 and 49, meshingly engaging in a suitably-sealed conventional gear box 50, are respectively mounted on adjacent end portions of the third and fourth conveying-element segments 44 and 45. Thus, axial rotation of the third conveying-element segment 44 causes the fourth conveying-element segment 45 to axially rotate in the same rotational direction.

An additional feature of the present invention, which allows the first and second conveyor-housing segments 32 and 33 to fold at the hinge joint 38, will now be discussed. Briefly, this feature allows the first and second conveying-element segments 42 and 43 to readily disengage and be disposed transverse to each other to allow the screw conveyor 20 to be folded at the hinge joint 38 as above mentioned. Yet, this feature also allows the thus spaced-apart conveying-element segments 42 and 43 to readily be brought back into co-linear engagement to allow the screw conveyor 20 to function as above-discussed.

Disposed within the conveyor housing 22 adjacent the hinge joint 38 are abuttingly engageable fingers 54 and 55 (FIG. 4), respectively mounted on the first and second conveying-element segments 42 and 43. The first finger 54 is carried by the first conveying-element segment 42, and the second finger 55 is integral with the second conveying-element segment 43. Abutting engagement of the fingers 54 and 55 allows axial rotation of the first conveying-element segment 42 to cause axial rotation of the second conveying-element segment 43 in the same sense. The first conveying-element segment 42 includes a female end 58. The second conveying-element segment 43 includes a male end 56 which is readily disposed into the opening 57 of the female end 58 (of the first conveying-element segment 42), for positively locating the axis of rotation of the second conveying-element segment 43 relative to the axis of rotation of the first conveying-element segment 42 when the hinge joint 38 is closed. That is, by design, the first and second conveying-element segments 42 and 43 are co-linearly disposed when the screw conveyor 20 operates as described above. As shown in FIG. 3, however, the disposition of the second segment 43 relative to the third segment 44 and the disposition of the third segment 44 relative to the fourth segment 45 is not co-linear.

Further maintaining the co-linear disposition of the first segment 42 relative to the second segment 43 are latch means 60 and 61 (FIGS. 1 and 2). The latch means 60 and 61 are spaced about 180 degrees from the hinge joint 38. The latch means 60 and 61 are respectively mounted on the exterior surfaces of the first and second conveyor-housing segments 32 and 33 adjacent the flanged end portions thereof. The first conveying-element segment 42 also includes spring-biasing means 63 for causing the male-end portion 56 and the female-end portion 58 to biasingly engage each other. Such biased engagement ensures above-mentioned engagement between the first and second fingers 54 and 55.

Referring now briefly to FIG. 4, the manner in which the fingers 54 and 55 engage and disengage to cause the first and second conveying-element segments 42 and 43 to axially rotate together will now be discussed. The female end 58 is longitudinally slideable within, but does not axially rotate relative to, the first conveying-element segment 42. Integral with the female end 58 is the first finger 54. As the first segment 42 axially rotates and causes the first finger 54 to disengage from the second finger 55, further axial rotation of the first segment 42 in the same sense causes the first finger 54 (shown as being in the background in FIG. 4) to rotate over the top side of the second segment 43 and eventually again engage the second finger 55, thereby causing the first and second segments 42 and 43 to again axially rotate together in the same rotational sense.

Thus, the latch means 60 and 61, the male and female ends 56 and 58, and the spring-biasing means 63 all co-act to positively bring the first and second conveying-element segments 42 and 43 together to function as described above, when it is desirable to move the feed chute 26 from the transport position (FIG. 1) into the so-called "working" position to fill the storage hopper 10 as above described.

Typical operation of the screw conveyor 20 to fill the storage hopper 10, will now briefly be discussed. A grain truck (not shown) conveniently dumps seed or other particulate material into the feed chute 26 now located on the ground G. The seed or particulate material is thus gravity fed into the feed chute 26, and axial rotation of the conveying element 24 (as above discussed) causes the seed to be conveyed by the conveying element 24 through the first and second conveyor-housing segments 32 and 33. These segments 32 and 33 are together typically disposed slightly upwardly, relative to the horizontal. That is, from the feed chute 26, the seed or other particulate material is conveyed upwardly by the co-linearly disposed first and second conveying-element segments 42 and 43.

The second conveying-element segment 43 then supplies the seed to the third or so called "inclined" conveying-element segment 44. The third segment 44 is relatively more inclined from the horizontal than are the first and second segments 42 and 43. The third segment 44 transfers the seed through the fourth conveyor-housing segment 35, and thereafter feeds the seed into the so-called "upper" or fifth conveyor-housing segment 36. That is, the third conveying-element segment 44 supplies seed to the fourth conveying-element segment 45 which is disposed in the fifth conveyor-housing segment 36.

The inclined conveying-element segment 44 includes flights 66 (FIG. 3) at the discharge end thereof. The flights 66 exert sufficient centrifugal force on the seed so as to cause the seed to pass through a right-angled elbow 64 (FIG. 3) located adjacent the gear box 50. The conventional gear box 50 typically accommodates normally-encountered thrust and radial loads, without binding up and without resulting in gear failure. The fourth outlet hole 31 is located in the vicinity of the right-angled elbow 64 to fill the near end of storage hopper 10. A fifth outlet 67 is located in the vicinity of end plate 64 to prevent plugging of the screw conveyor 20. Generally, however, a major portion of the seed or other particulate material being conveyed is discharged either at the first, second, third, or fourth outlet holes 28, 29, 30, or 31 as follows.

As the seed or other particulate material discharges through the third and fourth discharge openings 30 and 31, and as the storage hopper 10 begins to fill, the particulate material tends to fill only that portion of the storage hopper 10 which is beneath the discharge openings 30 and 31. Eventually, particulate material can no longer fall from the third opening 30 and the material thereafter tends to fall through the second opening 29. The particulate material now falling through opening 29 similarly tends to fill only that portion of the storage hopper 10 located therebeneath. That portion of the storage hopper 10, too, eventually fills and blocks further flow of particulate material through the second opening 29. The storage hopper 10 is thereafter filled, substantially to its volumetric capacity limit, via gravity discharge through the first opening 28. When the storage hopper 10 is filled to a desired level, the tractor operator turns off the drive means 62. The provision of openings in end plate 65 acts to prevent the auger from completely filling, thus stalling the drive motor which could require time-consuming manual unplugging and cleaning.

What has been illustrated and described herein is a foldable and swivelable hopper-loading screw conveyor. While the screw conveyor has been illustrated and described with reference to preferred embodiments, the present invention is not limited to these embodiments. That is, the foregoing specification and preferred embodiment is intended to be illustrative and is not to be taken as limiting. Thus, alternatives, such as structural or mechanical equivalents, and other changes or modifications may become apparent to those skilled in the art upon reading the foregoing description. Other variations of the present invention are of course possible, and additional features of the screw conveyor of the present invention will readily present themselves to those skilled in the art. Accordingly, such alternatives, changes or modifications are to be considered as forming a part of the present invention insofar as they fall within the spirit and scope of the appended claims.

What is claimed is:

1. In a hopper mounted on the ground, a screw conveyor carried by the hopper, comprising:
   at least three conveyor-housing segments, one of the three conveyor-housing segments including an inlet, at least one of the other two conveyor-housing segments including at least one outlet;
   at least two axially-rotatable conveying-element segments disposed within the conveyor housing segments, the two conveying-element segments respectively having adjacent engaging end portions for causing the two conveying-element segments to axially rotate in the same sense thereby conveying particulate material through the three conveyor-housing segments from the inlet to the outlet;
   means mounted on a first adjacent pair of the three conveyor-housing segments for pivotally disengaging the conveying-element adjacent end portions and for disposing one of the three conveyor-housing segments transverse to the other two of the three conveyor-housing segments; and
   means mounted on at least one of the other two of the three conveyor-housing segments for respectively swiveling the two of the three conveyor housing segments, one of these two segments being swivelable relative to the other of these two segments, whereby the inlet can be positioned either adjacent the hopper and spaced above the ground or on the ground and spaced from the hopper.

2. The screw conveyor of claim 1 wherein the two conveying-element segments include at least one drive end portion, further comprising:
   drive means coupled to the drive end portion for axially rotatably driving the conveying-element segments; and
   means mounted on the adjacent conveying-element end portions for biasly engaging the adjacent end portions together, whereby the drive means causes both of the conveying-element segments to axially rotate together when the adjacent conveying-element end portions are biasly engaged.

3. In a transportable hopper for containing particulate material including seed, fertilizer and the like, a hopper-loading screw conveyor carried by the hopper, comprising:
   a conveyor housing segmented into at least three segments, the housing including an inlet and at least one outlet;
   means mounted on the housing and hingedly connecting an adjacent two of the three conveyor-housing segments, for pivotally disposing one of the two adjacent conveyor-housing segments transverse to the other one of the two adjacent conveyor-housing segments;
   an axially rotatable conveying element for conveying particulate material from the inlet to the outlet and for discharging particulate material from the housing outlet into the hopper, the conveying element being segmented into at least two segments, one of the two conveying-element segments being disposed in said one of the two adjacent conveyor-housing segments, the other one of the two conveying-element segments being disposed in said other one of the two adjacent conveyor-housing segments, the two conveying-element segments respectively having adjacent engageable end portions;
   means mounted on at least one of the two conveying-element adjacent end portions for biasly engaging the two adjacent end portions together; and
   means carried by the conveyor housing for swiveling the two hingedly-connected conveyor-housing segments relative to the third conveyor-housing segment.

4. The screw conveyor of claim 3 wherein the conveying-element includes at least one drive end portion, further comprising:
   drive means coupled to the drive end portion for axially rotatably driving the conveying element; and
   means mounted on the conveying-element adjacent end portions for biasly engaging the conveying-element adjacent end portions together, whereby the drive means causes both of the conveying-element segments to axially rotate together when the conveying-element adjacent end portions are biasly engaged.

5. In a transportable hopper for containing particulate material including seed, fertilizer and the like, the hopper including wheels for supporting the hopper on the ground and a hopper inlet for filling the hopper, a hopper-loading screw conveyor carried by the hopper, comprising:

a conveyor housing segmented into at least three segments, the housing including a conveyor-housing inlet and at least one outlet spaced above the hopper inlet, one of the two adjacent conveyor-housing segments having the conveyor-housing inlet mounted thereon;

means mounted on the housing and hingedly connecting an adjacent two of the three conveyor-housing segments for pivotally disposing the conveyor-housing inlet-mounted one of the two adjacent conveyor-housing segments transverse to the other one of the two adjacent conveyor-housing segments and in proximate relation to the transportable hopper;

a conveying element for conveying particulate material from the conveyor-housing inlet to the conveyor-housing outlet and for discharging particulate material from the conveyor-housing outlet into the hopper inlet, the conveying element being segmented into at least two segments, one of the two conveying-element segments being disposed in said one of the two adjacent conveyor-housing segments, the other one of the two conveying-element segments being disposed in said other one of the two adjacent conveyor-housing segments, the two conveying-element segments respectively having adjacent end portions;

means mounted on at least one of the two conveying-element adjacent end portions for biasly engaging the adjacent end portions together; and means carried by the conveyor housing for swiveling the two hingedly-connected conveyor-housing segments relative to the third conveyor-housing segment, for spacing the conveyor-housing inlet in distal relation to the transportable hopper and for disposing the conveyor-housing inlet-mounted one of the two adjacent conveyor-housing segments on the ground.

6. The screw conveyor of claim 5 wherein the two conveying-element segments include at least one drive end portion, further comprising:

drive means coupled to the drive end portion for axially rotatably driving the conveying-element segments; and means mounted on the conveying-element adjacent end portions for biasly engaging the conveying-element adjacent end portions together, whereby the drive means causes both of the conveying-element segments to axially rotate together when the conveying-element adjacent end portions are biasly engaged.

7. The screw-conveyor of claim 5, including sleeve means for rotating said one of said segments having said inlet thereon relative to said means for biasingly engaging for accommodating selective orientation of said inlet.

* * * * *